United States Patent [19]

Hackman et al.

[11] 4,269,383

[45] May 26, 1981

[54] SUCTION CUP WITH LATERAL GRIPPER

[75] Inventors: Donald J. Hackman, Columbus; Roger L. Brunel, Grove City; Harry L. Williams, West Jefferson, all of Ohio

[73] Assignee: The United States of America as represented by the Secretary of the Navy, Washington, D.C.

[21] Appl. No.: 21,288

[22] Filed: Feb. 23, 1979

[51] Int. Cl.³ .......................................... F16M 13/00
[52] U.S. Cl. ................................... 248/544; 248/362; 248/216.4; 248/680
[58] Field of Search ............... 248/206 A, 216.4, 362, 248/363, 677, 680

[56] References Cited

U.S. PATENT DOCUMENTS

| 1,772,439 | 8/1930 | Garbs | 248/362 X |
| 1,801,723 | 4/1931 | Clifford | 248/362 X |
| 2,936,139 | 5/1960 | Lindstrom | 248/362 X |
| 3,770,259 | 11/1973 | Wagreich | 248/362 X |
| 4,019,735 | 4/1977 | Thompson | 248/362 X |

FOREIGN PATENT DOCUMENTS

2605914  8/1977  Fed. Rep. of Germany ........... 248/362

*Primary Examiner*—William H. Schultz
*Attorney, Agent, or Firm*—R. S. Sciascia; P. C. Lall

[57] ABSTRACT

A device for preventing or substantially reducing lateral slippage of an object which is held to the surface of another object by suction means is provided. Suction pads are mounted so as to allow conformation with irregularities of the supporting object's surface and are provided with prongs preferably made of sharpened tool steel which are oriented to dig into the surface to preclude lateral slippage during operation.

14 Claims, 7 Drawing Figures

SUCTION CUP WITH LATERAL GRIPPER

This invention concerns apparatus for carrying out operations with suction supported equipment and, more particularly, to such operations where control of lateral movement is required.

In using equipment held to an object by suction cups such as underwater tools, it is necessary to hold onto the object with a force great enough to prevent the equipment from being dislodged. Such a force is great enough to prevent lateral movement on most objects in the atmosphere but not sufficient to prevent movement along the surface of a submerged object, particularly where the suction cup pads are allowed to float to conform with irregularities in the surface while the equipment is being repositioned. The present invention provides means for preventing such lateral slippage during repositioning or under other work conditions.

Accordingly, it is an object of the present invention to provide means for preventing lateral movement of objects held to surfaces by suction forces.

Another object of this invention is to provide means for holding forces along the surface of an object which add to the holding force of suction cups in use.

A further object of this invention is to provide means for use with suction cups mounted ball joints which permit the suction-held object to float to conform with surface irregularities while preventing lateral slippage especially during repositioning of the object.

Other objects, advantages and novel features of the invention will become apparent from the following detailed description thereof when considered in conjunction with the accompanying drawings in which like numerals represent like parts throughout and wherein.

The present invention, in general, relates to suction cups primarily for use with underwater tools, and gripper means associated with the cups for preventing lateral slippage thereof during operation when the cup pads are allowed to float to conform with irregularities while the tools are repositioned.

Figure 1:
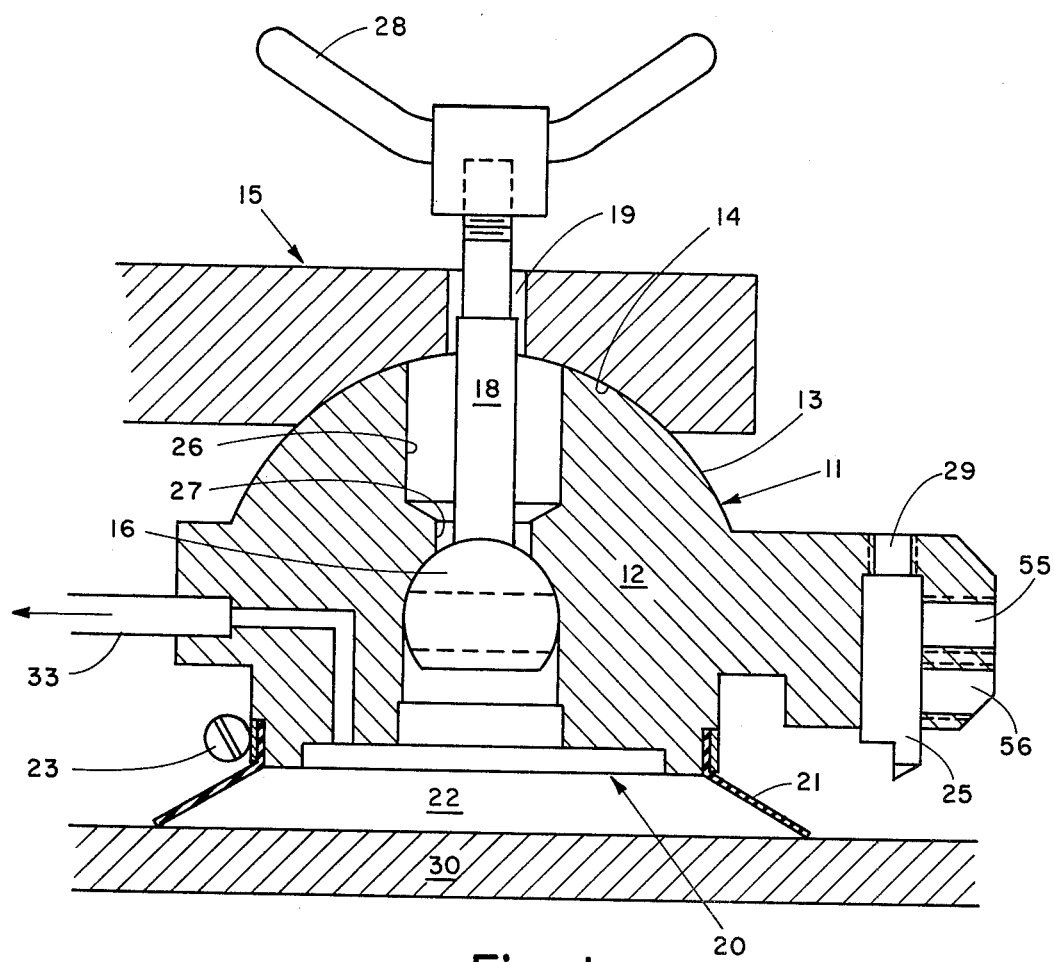
FIG. 1 is a sectional view of a preferred embodiment of the suction cup assembly of the invention including supporting hardware.
Figure 3:
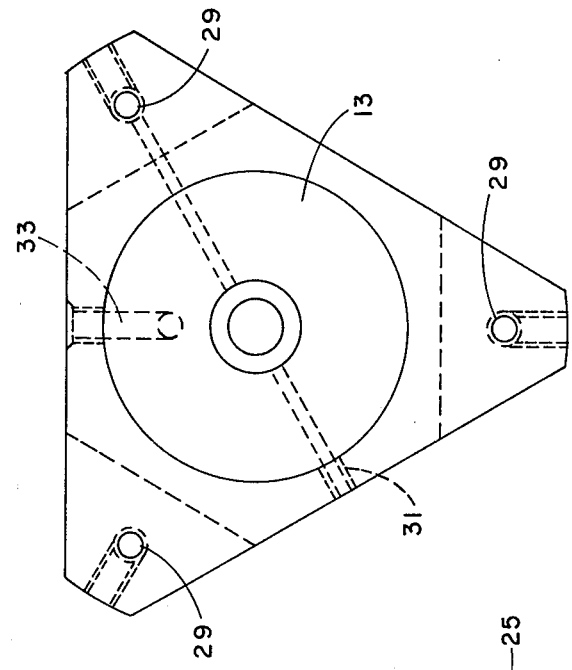
FIG. 3 is a plan view of the suction cup body shown in section in FIG. 1.
Figures 4, 5:
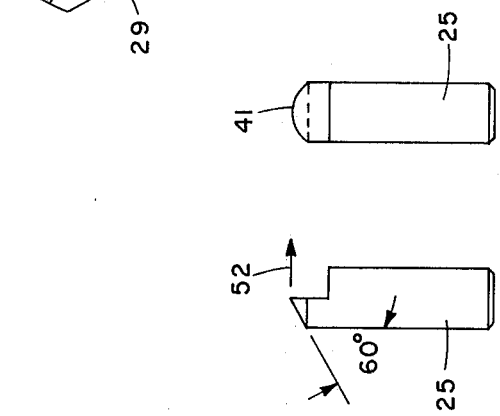
FIG. 4 is a front elevation of a preferred gripper device for the present invention.
FIG. 5 is a side elevation of the gripper device of FIG. 4.
Figure 6:
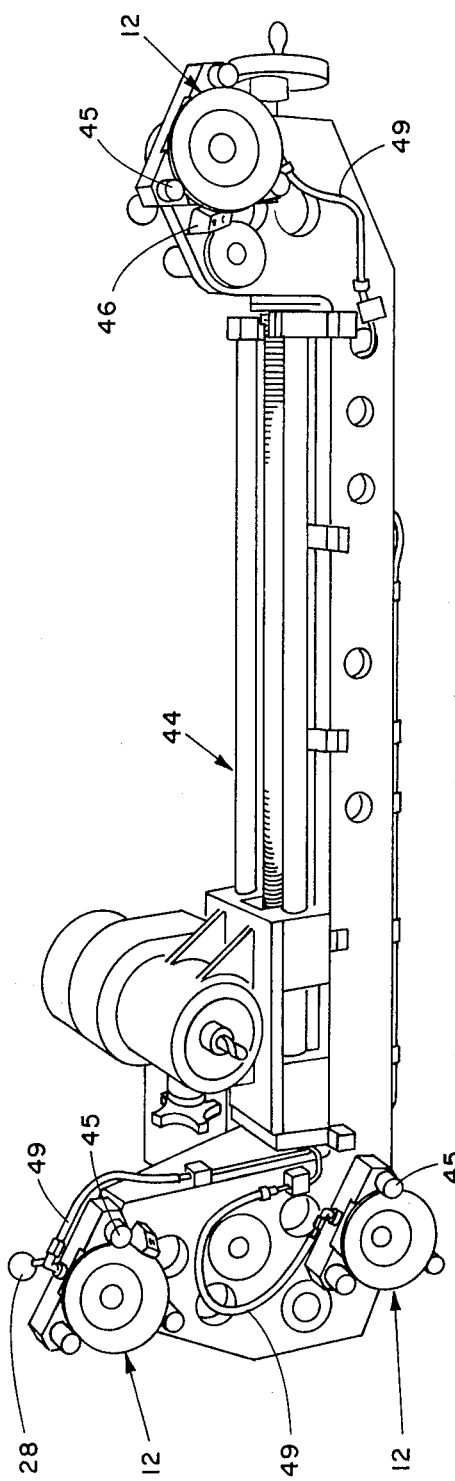
FIG. 6 is a perspective view of an underwater milling machine having a plurality of suction cups and associated hardware attached thereto.

Referring to the drawings, FIG. 1 is a sectional view of a suction cup assembly that includes a ball joint 11 in which a suction cup body 12 having a spherical surface 13 is movable in a mating surface 14 of a tool 15, a ball joint retainer 16 for holding body 12 in tool 15 via a rod 18 which may be secured by threading into a receptacle 19, a suction cap pad 20 preferably having a neoprene sealing edge 21, which forms a cavity 22, and a clamp 23 for securing cap pad 20 to body 12. Body 12 is adapted to receive a plurality of gripping prongs 25 which preferably are made of sharpened tool steel. The cup body is pivotable with respect to tool 15 within the limits of a major recess 26 and a minor recess 27 in body 12 and is secured in place by tightening a wing screw lock 28 connected to rod 18. Prongs 25 are extended to the desired gripping position by turning a set screw 29a in a threaded opening 29 in body 12, after cavity 22 has been evacuated, to cause them to penetrate into an object 30. FIG. 3 is a reduced plan view of cup body 12 showing a triangular arrangement of recesses 29 for prongs 25, an opening 31 for receiving a positioning pin 47 shown in FIG. 7, and a flow passage 33 for removing fluid from cavity 22 to provide the desired suction. The individual cap pads may be connected to a manifold, not shown, which may be evacuated by a suitable seawater or fresh water evacuation system, not shown, to provide suction on the order of 200 psi or greater depending upon the water depth in which the device is being operated. FIGS. 4 and 5 show prongs 25 in front and side elevation, respectively, while FIG. 6 illustrates a tool 44 having three suction cups attached to it to add lateral holding force to the tool. Each prong is protected by a cover 45.

Figure 7:
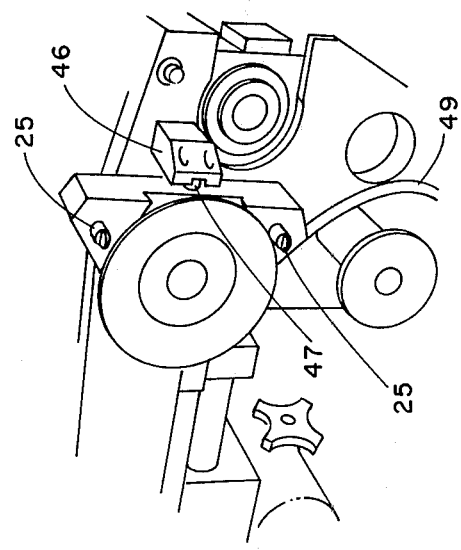
FIG. 7 is an enlarged perspective view of a suction cup body and the prongs associated therewith mounted on the milling machine shown in FIG. 6.

The prongs preferably have a curved gripping edge as indicated at 41 in FIG. 5 and are beveled at preferably a 60° angle along their gripping edge. An anti-rotation block 46 shown in FIG. 6 is secured to the workpiece, i.e. tool 44 in this instance, and has a slot in which a pin 47 seen in FIG. 7 slides and is pressed into opening 31 in the suction cup body to preclude the body from rotating. FIG. 7 also shows a cup assembly with the prongs bared and a hose 49 leading from each suction cup to a suction pump, not shown. The cup pads preferably are made of aluminum.

Figure 2:
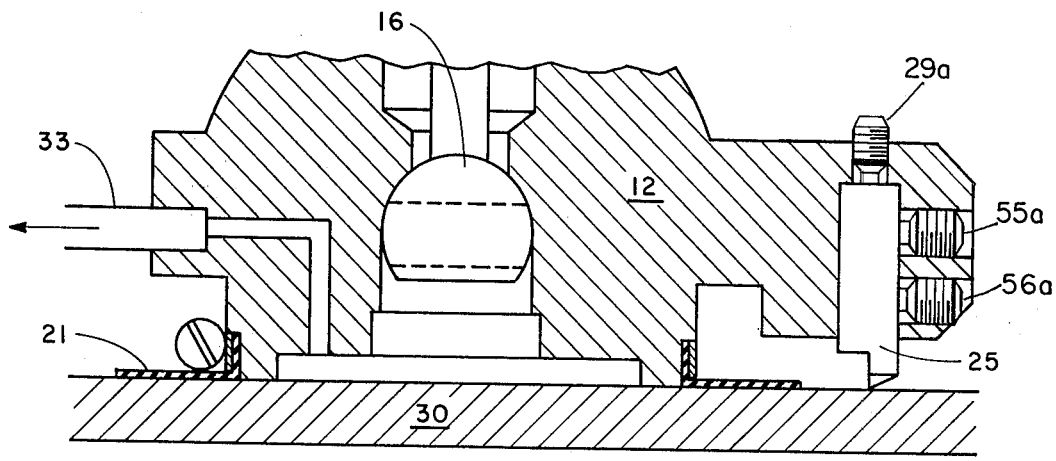
FIG. 2 is a view of the assembly of FIG. 1 with the suction cup evacuated and conforming to the surface of an object.

In operation, the suction cup assemblies are attached to underwater tools such as drill presses, milling machines, lifting attachments and other equipment required to be held onto an object with greater force than a diver can provide. This force is supplied by conventional suction cups but is effective perpendicular to the object only. A lateral holding force is provided by adjusting the cup pads to conform with irregularities in the workpiece surface while the equipment is being positioned. After adjustment, the cavities formed by the suction cup sealing edges are evacuated so as to cause the edges to conform to the surface of the object as shown in FIG. 2. Thereafter, wing screw lock 28 is tightened to hold retainer 16 rigidly in its socket in suction cup body 12. Prongs 25 are next inserted into recesses 29, oriented in the position shown in FIG. 4 for restricting motion in the direction of arrow 52, and locked in place by adjusting set screws 55a, 56a in adjacent openings 55 and 56 in the cup body.

There is thus provided a vacuum cup with means for piercing the surface to which the vacuum cup is attached to prevent lateral movement along that surface. The vacuum cup is mounted on a ball joint and evacuated internally by a suction pump or other means and sharpened metal points are inserted through and secured to the cup body to penetrate the underlying surface. The invention is particularly useful in underwater engineering and construction equipment such as oil rigs or similar structures and is also an aid in salvage activities, among other uses. The surface-penetrating means, of course, may be made of any suitable material and may have other point configurations than those shown and described such as tines or serrated edges within the concept of the invention.

What is claimed is:

1. A device for precluding lateral movement of objects held by suction against a surface, comprising:
   a suction cup attached to an object for holding the object to the surface,
   the suction cup having a resilient sealing edge;
   means for evacuating the suction cup; and
   at least one surface gripper retentively held by and adjustably protruding from the object to the surface adjacent to the sealing edge,
   the gripper penetrating the surface when the suction cup is evacuated thereby precluding lateral movement of the object along the surface.

2. The system as defined in claim 1 wherein said suction cup includes a cup body and means attaching said body to an object;
   said body having an opening for receiving said gripper;
   means in said opening for extending said gripper a distance sufficient to cause penetration of said surface; and
   means in said body for locking said gripper in place, said gripper rotated before locking to present the gripping end thereof in the most effective position to obstruct expected object movement along said surface.

3. The system as defined in claim 2 wherein said body is adapted to receive a plurality of grippers and a plurality of grippers in said body selectively turned to obstruct omnidirectional movement of said object.

4. The system as defined in claim 3 wherein said object includes a spherically shaped socket and said body is adapted to mate with and pivot in said socket so as to conform to irregularities in said surface; and
   means for locking said body in said socket after said conforming adjustment.

5. The system as defined in claim 4 and further including means removable from said body for pinning said body to said object to prevent rotation relative to said object after adjustment to said surface.

6. An arrangement for precluding lateral movement of objects held by suction against a surface comprising:
   an object having a suction cup body attached thereto and a a suction cup formed in said suction cup body;
   means for evacuating fluid from said suction cup, said suction cup including a flexible sealing edge which forms a conical periphery before cup evacuation and is colinear with said surface after evacuation;
   at least one gripper means secured in said body and means for adjusting said gripper means to penetrate said surface when said cup is evacuated; and
   means for securing said gripper means in said body after adjustment thereof so that linear movement of said suction cup body relative to said object is substantially reduced or prevented.

7. The arrangement as defined in claim 6 wherein said object includes a spherically shaped socket and said suction cup body is adapted to mate with and pivot in said socket so as to conform to irregularities in said surface; and
   means for locking said body in said socket after said conforming adjustment.

8. The arrangement as defined in claim 7 wherein said body is formed so as to extend beyond said sealing edge at a plurality of points to accommodate gripper means; and
   a gripper means extending from said body at each of said points to provide a plurality of places of penetration of said surface.

9. The arrangement as defined in claim 8 wherein said points have openings therethrough for accommodating said gripper means,
   said gripper means moved axially through said openings into contact with and penetration of said surface after said suction cup has been evacuated; and
   means locking said gripper means in place after said penetration.

10. The arrangement as defined in claim 9 wherein said gripper means are rotated before locking to present the gripping ends thereof in the most effective position to obstruct object movement; and
    means for adjusting said gripper means axially in said openings and thereafter said means locking said gripper means transversely binding said gripper means in said openings after selected penetration of said surface has been achieved.

11. The arrangement as defined in claim 10 wherein a plurality of suction cup bodies and gripper means are mounted on said object to provide selected additional places of surface penetration and obstruction of movement.

12. The arrangement as defined in claim 11 wherein the gripping edge of said gripper means is arcuate and beveled at an angle of substantially 60° to the longitudinal axis thereof.

13. A device for preventing or substantially reducing lateral slippage of equipment which is held to the surface of an object by suction comprising:
    a plurality of suction pad bodies each having a suction pad secured thereto,
    means pivotally mounting said bodies on said equipment to permit adjustment to conform to irregularities in said surface;
    means for securing said bodies to said equipment after said adjustment,
    means for evacuating said suction pads; and
    means in said suction pad bodies adapted to be extended to said surface and to penetrate said surface upon evacuation of said suction pads so as to obstruct lateral movement of said equipment along said surface.

14. The device as defined in claim 13 wherein said means for penetrating said surface include metal prongs positioned in said bodies, means extending said prongs to said surface, and means locking said prongs in place,
    said prongs having a curved cutting edge for penetrating said surface,
    said prongs rotatable to different angles before being locked so as to provide omnidirectional obstruction to movement of said equipment on said surface.

* * * * *